United States Patent Office 3,454,283
Patented July 8, 1969

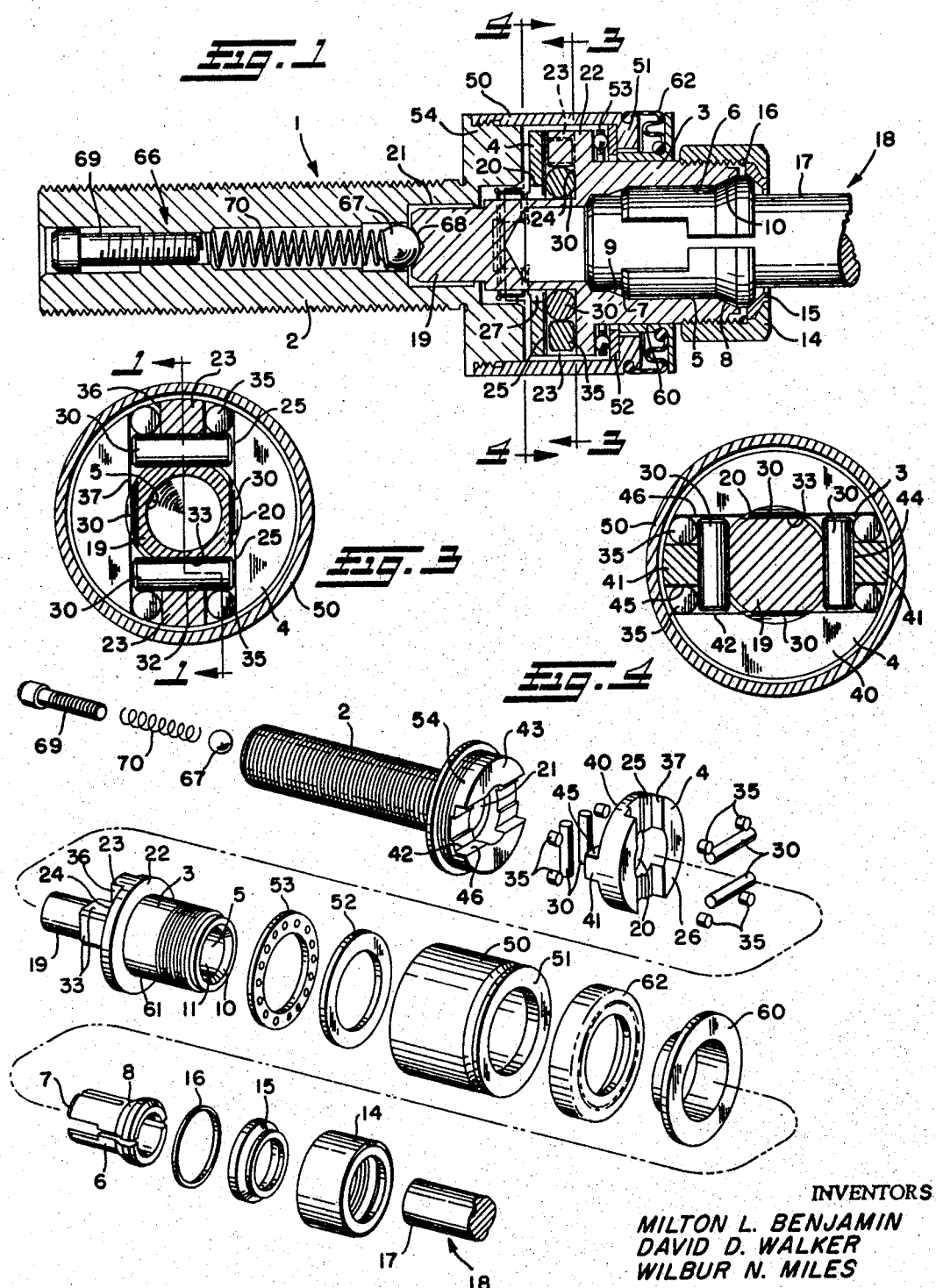

3,454,283
FLOATING HOLDER
Milton L. Benjamin, David D. Walker, and Wilbur N. Miles, Chagrin Falls, Ohio, assignors to Erickson Tool Company, Solon, Ohio, a corporation of Ohio
Continuation-in-part of application Ser. No. 528,551, Feb. 18, 1966. This application Jan. 25, 1967, Ser. No. 611,667
Int. Cl. B23b 31/00, 5/22, 5/34
U.S. Cl. 279—16                       14 Claims

ABSTRACT OF THE DISCLOSURE

A floating holder having a driver plate interposed between the holder shank and housing and keyed thereto for permitting limited transverse movement of the holder shank in any direction to compensate for axial misalignment of a tool carried by the holder shank and a workpiece to be machined thereby. Cylindrical rollers between adjacent surfaces of driver plate, holder shank, and housing transmit axial thrust and torque loads from one to the other, whereby very little force is required to effect such transverse movement.

---

The present invention relates generally, as indicated, to a floating holder, and more particularly to certain improvements in a tool holder especially of the type disclosed in the copending application of Milton L. Benjamin and David D. Walker, Ser. No. 528,551, filed Feb. 18, 1966, which permits the total to float or shift laterally with respect to the holder to compensate for any axial misalignment that might be present between such tool and a workpiece to be machined thereby.

The tool holder of such copending application consists of a housing in which there is received a tool gripping element and a driver plate having a sliding connection with both the housing and tool gripping element for coupling such members together against relative rotation while permitting limited lateral movement of the driver plate and tool gripping element as a unit in one direction with respect to the housing and limited lateral movement of the tool gripping element with respect to the housing and driver plate in a direction perpendicular to such one direction. Ball bearing assemblies between the housing and driver plate as well as between the driver plate and tool gripping element reduce substantially the friction therebetween, whereby the tool holder may be used either with a rotary spindle or a stationary one without interfering with the lateral movement of the tool gripping element which is required to compensate for misalignment between the tool and a workpiece.

A principal object of this invention is to provide a floating holder having all of the advantages of the holder just described which in addition is of a more simplified construction and less expensive to manufacture.

Another object is to provide such a holder in which both the axial thrust and torque loads acting on the tool are readily transmitted to the housing without disrupting the freedom of movement of the tool gripping element in a lateral direction. These and other objects are achieved by providing a driver plate between the tool housing and tool gripping element with cylindrical rollers between adjacent surfaces thereof for reducing friction. Selected ones of the rollers extend in a direction transverse to the tool holder axis for transmitting the axial thrust loads, while others extend in a direction parallel to such holder axis for transmitting the torque loads.

Other objects and advantages of the present invention will become apparent as the folowing description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principles of the invention may be employed.

In said annexed drawing:

FIG. 1 is a longitudinal section view of a preferred form of tool holder in accordance with this invention taken on the plane of the line 1—1, FIG. 3;

FIG. 2 is an exploded perspective view showing the tool holder of FIG. 1 in disassembled form; and FIGS. 3 and 4 are vertical transverse sections taken on the planes of the lines 3—3 and 4—4 of FIG. 1 to show the sliding connections between the holder shank and driver plate and driver plate and housing, respectively.

Referring now in detail to the drawing, there is shown by way of example a preferred form of tool holder 1 which generally consists of a housing 2 having a floating holder shank 3 coupled thereto as by means of an intermediate driver plate 4 in a manner to be subsequently explained.

The floating holder shank 3 has an opening 5 in one end of receipt of a suitable collet 6 which may be of conventional form, axially slotted from opposited ends having a nose ring 15 held therewithin by a snap ring 16 in mating engagement with frusto-conical seats 9 and 10 formed in the wall 11 of the opening 5. A nose piece 14 having a nose ring 15 held therewithin by a snap ring 16 is threaded onto the forward end of the shank 3, whereby when the nose piece 14 is tightened, the nose ring 15 will be forced against the collet 6 to cause such collet to move inwardly against the frusto-conical seats 9 and 10 for radial contraction of the collet into tight gripping engagement with the shank 17 of a reamer 18 or similar type tool.

The inner end 19 of the holder shank 3 extends through a central aperture 20 in the driver plate 4 for receipt in a counterbore 21 in the housing 2. A flange 22 on the holder shank 3 intermediate the ends thereof has a pair of diametrically opposed peripheral lugs 23 on its inner face 24 which are received in diametrically opposed slots 25 in the adjacent driver plate surface 26 for keying of the holder shank 3 and driver plate 4 against relative rotational movement while permitting slight lateral movement therebetween to the extent of the diametral clearance 27 between the shank 3 and wall of the central aperture 20. Cylindrical thrust rollers 30 extending in a transverse direction to the axis of the holder are confined in the slots 25 between the opposed flat surfaces 32, 33 on the lugs 23 and inner shank end 19, respectively. The diameter of the thrust rollers 30 is somewhat greater than the length of the lugs 23 and depth of slots 25, whereby axial thrust loads on the tool 18 are transferred from the holder shank 3 to the driver plate 4 through the thrust rollers 30 and the opposed faces 24, 26 of the holder shank 3 and driver plate 4 are maintained out of frictional contact with each other.

Additional cylindrical rollers 35 having their axes parallel to the holder axis are disposed between the opposed sides 36, 37 of the lugs 23 and slots 25 for transmitting torque loads from the holder shank 3 to the driver plate 4 while eliminating frictional contact therebetween. The lengths of the torque rollers 35 are somewhat less than the diameter of the thrust rollers 30 as shown to avoid clamping of the ends of the torque rollers 35 between the inner face 24 of the shank flange 22 and the bottom of the slots 25. Thus, as is now apparent, the rollers 30, 35 reduce the friction between the holder shank 3 and driver plate 4 to a minimum even under high axial thrust and torque loads, thereby allowing limited freedom of movement of the holder shank 3 with respect to the driver plate 4 in the direction of the slots 25.

The driver plate 4 is similarly keyed to the housing 2 against relative rotation while permitting limited freedom of movement of the driver plate 4 and holder shank 3 as a unit but in a direction perpendicular to that in which the holder shank 3 is free to move with respect to the driver plate 4. For that purpose, the inner face 40 of the driver plate 4 has a pair of diametrically opposed peripheral lugs 41 projecting therefrom which are desirably spaced 90° from the slots 25 in the opposite face 26 and adapted to be received in diametrically opposed slots 42 in the inner face 43 of the housing 2. As with the drive connection between the driver plate 4 and holder shank 3, there is a cylindrical roller 30 disposed in each slot 42 between opposed flat surfaces 44, 33 on the lugs 41 and shank end portion 19 and rollers 35 between the opposed sides 45, 46 of the lugs 41 and slots 42 having a length somewhat shorter than the diameter of the rollers 30 for transmitting axial thrust and torque loads from the driver plate 4 to the housing 2 and reducing the friction therebetween to permit free movement of the driver plate 4 in the direction of the slots 42 to the extent of the clearance between the shank end portion 19 and wall of the counterbore 21.

A housing cap 50 having an inturned end 51 with a front thrust washer 52 and ball thrust bearing 53 inserted therein may be telescoped over the holder shank 3 and driver plate 4 and threaded onto a flange 54 of the housing 2 for maintaining the various elements of the floating holder 1 in assembled condition. Likewise, a seal shield 60 to which one end of a rubber seal member 62 is attached may be closely slidably received on the outer end portion 61 of the holder shank 3 between the inturned cap end 51 and nosepiece 14 and the other end of the seal member is attached to the housing cap 51 to prevent moisture and dust particles from entering the interior of the holder.

In operation, the housing 2 of the holder 1 is threaded or otherwise suitably mounted on the spindle of a machine tool, not shown, and the tool 18 or workpiece are caused to be moved relative to each other to bring the tool into approximate alignment with a hole or the like in the workpiece. Should there be any slight axial misalignment between the tool and hole, the sliding connections between the holder shank 3, driver plate 4, and housing 2 will permit lateral shifting of the holder shank 3 and thus the tool 18 with respect to the housing 2 to compensate for such misalignment. The floating holder 1 operates equally well whether the tool is held stationary and the workpiece rotated or the tool is rotated and the workpiece held stationary, since the cylindrical rollers 30, 35 permit substantially unrestricted movement of the tool back and forth even under high axial thrust and torque loads. Of course, the diametral clearance between the holder shank 3 and the housing 2, driver plate 4 and housing cap 50 as well as between the seal shield 60 and housing cap 50 should be sufficient to accommodate the maximum amount of axial misalignment which is ordinarily encountered when performing typical machining operation, such as reaming for example.

A spring centering mechanism 66 in the housing 2 having a ball bearing 67 biased into engagement with a conical seat 68 in the end of the holder shank 3 automatically centers the holder shank 3 and thus the tool 18 with respect to the housing 2 in known manner upon release of the lateral shifting force, as when the tool is removed from a misaligned hole subsequent to the reaming operation. An adjustable backup screw 69 for the spring 70 may be provided for varying the force applied by the spring 70 against the ball bearing 67.

It can now be seen that the floating holder of the present invention is of a unique and simple construction which permits ready shifting of the tool held thereby in a transverse direction to compensate for axial misalignment between the tool and a workpiece. Due to the novel arrangement of cylindrical rollers between the holder shank, driver plate, and housing, the tool is free to move in a lateral direction at high speeds even though the axial thrust and torque loads may be high. Moreover, during such lateral movement, the angular position of the tool always remains parallel to the axis of the housing, whereby a direct force of small magnitude rather than a high force couple acting on the end of the tool is all that is required to effect such movement.

Other modes of applying the principles of the invention may be employed, change being made as regards the details described, provided the features stated in any of the following claims or the equivalent of such be employed.

We therefore particularly point out and distinctly claim as our invention:

1. A tool holder for permitting limited lateral movement of a tool held thereby to compensate for axial misalignment between such tool and a workpiece comprising a housing, a holder shank supported by said housing and having means for tightly gripping a tool, a driver plate interposed between adjacent surfaces of said housing and holder shank, a transverse slot in one of said driver plate and holder shank and a lug projecting from the other of said driver plate and holder shank into said transverse slot for keying together of said driver plate and holder shank against relative rotation while pemitting limited lateral movement therebetween, transversely extending cylindrical rollers between said driver plate and holder shank for transmitting axial thrust loads from said holder shank to said driver plate, and axially extending cylindrical rollers interposed between the adjacent surfaces of said slot and lug for transmitting torque loads from said holder shank to said driver plate.

2. The tool holder in accordance with claim 1 wherein the diameter of said transversely extending cylindrical rollers is sufficient to provide a clearance between the ends of said axially extending cylindrical rollers and the adjacent surfaces of said driver plate and holder shank.

3. The tool holder in accordance with claim 1 wherein there are two parallel slots in one of said drive plate and holder shank and two lugs projecting from the other of said driver plate and holder shank into said slots for keying of said driver plate and holder shank together as aforesaid.

4. The tool holder in accordance with claim 3 wherein said driver plate has a central opening therein, said holder shank has a reduced end portion projecting through said central opening, said lugs are radially outwardly spaced from said reduced end portion, and said transversely extending cylindrical rollers are confined between said lugs and said reduced end portion.

5. The tool holder in accordance with claim 4 wherein opposed surfaces of said lugs and reduced end portion are substantially flat and parallel to provide line contact with said transversely extending cylindrical rollers.

6. The tool holder in accordance with claim 4 wherein said driver plate and housing are similarly keyed together against relative rotation while permitting limited lateral movement of said driver plate and holder shank as a unit with respect to said housing in a direction other than that in which said holder shank is movable with respect to said driver plate, and there are additional transversely extending and axially extending cylindrical rollers between said housing and driver plate for transmitting axial thrust and torque loads from said driver plate to said housing.

7. The tool holder in accordance with claim 6 wherein the diameter of said transversely extending cylindrical rollers between said housing and driver plate is sufficient to provide a clearance between the ends of said axially extending cylindrical rollers and the adjacent surfaces of said driver plate and housing.

8. The tool holder in accordance with claim 6 further comprising spring centering means interconnecting said housing and holder shank for yieldably maintaining said holder shank in coaxial alignment with said housing.

9. A floating holder for permitting limited transverse movement of a tool held thereby to compensate for axial misalignment between such tool and a workpiece comprising a housing, a holder shank removably attached to said housing, said holder shank having means for tightly gripping a tool, a driver plate interposed between adjacent surfaces of said housing and holder shank, said driver plate having a central aperture through which a reduced end portion of said holder shank extends, first means for keying said driver plate and holder shank together against relative rotation while permitting limited lateral movement therebetween in one direction, second means for keying said driver plate to said housing against relative rotation while permitting limited lateral movement of said driver plate and holder shank as a unit with respect to said housing in another direction, a plurality of transversely extending cylindrical roller means interposed between said driver plate and holder shank and holder shank and housing for transmitting axial thrust loads from said holder shank to said driver plate and driver plate to said housing, and a plurality of axially extending cylindrical roller means for transmitting torque loads from said holder shank to said driver plate and said driver plate to said housing.

10. The floating holder of claim 9 wherein said first and second means for keying said driver plate to said holder shank and housing comprise lug and slot connections between both said driver plate and holder shank and driver plate and housing, said transversely extending cylindrical roller means being disposed between said lugs and said reduced end portion, and said axially extending roller means being disposed between opposed sides of said lugs and slots.

11. The floating holder in accordance with claim 10 wherein the diameter of said transversely extending cylindrical roller means is sufficient to provide a clearance between the ends of said axially extending cylindrical roller means and the adjacent surfaces of said driver plate and holder shank and driver plate and housing.

12. The floating holder in accordance with claim 10 wherein the opposed surfaces of said lugs and reduced end portion are substantially flat and parallel to provide line contact with said transversely extending roller means.

13. A holder comprising a housing, a holder shank supported by said housing, and means interconnecting said holder shank and housing for rotation together while permitting limited lateral movement therebetween, said last-mentioned means including a plurality of transversely extending cylindrical roller means for transmitting axial thrust loads from said holder shank to said housing, and a plurality of axially extending cylindrical roller means for transmitting torque loads from said holder shank to said housing.

14. The holder in accordance with claim 13 further comprising spring centering means interconnecting said housing and holder shank for yieldably maintaining said holder shank in coaxial alignment with said housing, said spring centering means comprising a ball bearing in said housing, a conical seat in the end of said holder shank adjacent said ball bearing, and spring means for biasing said ball bearing into engagement with said conical seat.

References Cited

UNITED STATES PATENTS 2,826,053   3/1958   Munn _____ 279—16 X

ROBERT C. RIORDON, Primary Examiner.

D. R. MELTON, Assistant Examiner.

U.S. Cl. X.R.

64—31